United States Patent
Daulton et al.

(10) Patent No.: US 7,968,018 B2
(45) Date of Patent: Jun. 28, 2011

(54) USE OF SURFACTANTS IN EXTRACTION PROCEDURES FOR SILICONE HYDROGEL OPHTHALMIC LENSES

(75) Inventors: Jay Scott Daulton, Gilroy, CA (US); Charlie Chen, San Ramon, CA (US); Tim Warren, Dublin, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 576 days.

(21) Appl. No.: 11/737,059

(22) Filed: Apr. 18, 2007

(65) Prior Publication Data

US 2008/0258322 A1    Oct. 23, 2008

(51) Int. Cl.
B29D 11/00 (2006.01)
B65D 85/38 (2006.01)
B29C 71/00 (2006.01)

(52) U.S. Cl. ..... 264/2.6; 264/1.32; 425/808; 425/403.1; 106/38.22; 106/38.9

(58) Field of Classification Search ........... 264/260, 264/2.6, 1.32; 425/808, 403.1; 106/38.2, 106/38.22, 38.9
See application file for complete search history.

(56) References Cited

U.S. PATENT DOCUMENTS

| | | | | |
|---|---|---|---|---|
| 3,882,036 A * | 5/1975 | Krezanoski et al. | ........... | 510/112 |
| 4,259,467 A * | 3/1981 | Keogh et al. | ........... | 526/279 |
| 4,782,946 A * | 11/1988 | Pollak | ........... | 206/223 |
| 5,080,839 A * | 1/1992 | Kindt-Larsen | ........... | 264/2.6 |
| 5,094,609 A | 3/1992 | Kindt-Larsen | | |
| 5,260,000 A | 11/1993 | Nandu et al. | | |
| 5,264,161 A | 11/1993 | Druskis et al. | | |
| 5,658,602 A * | 8/1997 | Martin et al. | ........... | 425/346 |
| 5,674,557 A | 10/1997 | Widman et al. | | |
| 5,675,962 A * | 10/1997 | Martin et al. | ........... | 53/445 |
| 5,690,866 A | 11/1997 | Andersen et al. | | |
| 5,804,107 A | 9/1998 | Martin et al. | | |
| 5,849,222 A * | 12/1998 | Jen et al. | ........... | 264/2.3 |
| 6,012,471 A * | 1/2000 | Calvin et al. | ........... | 134/58 R |
| 6,068,798 A * | 5/2000 | Lesczynski et al. | ........... | 264/2.6 |

(Continued)

FOREIGN PATENT DOCUMENTS

EP    1 693 688 A    8/2006

(Continued)

OTHER PUBLICATIONS

International Search Report completed and mailed Oct. 9, 2008 from corresponding PCT Application No. PCT/US2008/060886, filed Apr. 18, 2008 (7 pages).

(Continued)

*Primary Examiner* — Joseph S Del Sole
*Assistant Examiner* — Nahida Sultana
(74) *Attorney, Agent, or Firm* — Klein, O'Neill & Singh, LLP (57) ABSTRACT

Methods of producing silicone hydrogel ophthalmic lenses include contacting one or more delensed silicone hydrogel ophthalmic lens with a liquid composition that contains alcohol, water, and a surfactant. The methods can be steps of an extraction/hydration procedure used in the production of silicone hydrogel contact lenses. In some examples, contacting silicone hydrogel ophthalmic lens products with a liquid composition that contains alcohol, water, and a surfactant can significantly reduce or prevent surface distortion of the ophthalmic lens resulting from the extraction procedure. Some methods include subsequently contacting the silicone hydrogel ophthalmic lens with a liquid composition consisting essentially of water and a surfactant.

25 Claims, 4 Drawing Sheets

U.S. PATENT DOCUMENTS

| | | | |
|---|---|---|---|
| 6,071,112 A | 6/2000 | Calvin et al. | |
| 6,071,439 A | 6/2000 | Bawa et al. | |
| 6,193,369 B1* | 2/2001 | Valint et al. | 351/160 H |
| 6,207,086 B1 | 3/2001 | Schlagel et al. | |
| 6,423,820 B1 | 7/2002 | Ayyagari et al. | |
| 6,432,217 B1 | 8/2002 | Baxter et al. | |
| 6,494,021 B1* | 12/2002 | Schlagel et al. | 53/432 |
| 6,581,761 B1* | 6/2003 | Stafford et al. | 206/5.1 |
| 6,695,988 B1* | 2/2004 | Schlagel et al. | 264/2.6 |
| 6,849,210 B2* | 2/2005 | Bothe et al. | 264/1.36 |
| 6,939,487 B1* | 9/2005 | Ajello et al. | 264/2.6 |
| 7,011,513 B2* | 3/2006 | Russell | 425/225 |
| 7,040,886 B2* | 5/2006 | Calvin et al. | 425/454 |
| 7,163,583 B2 | 1/2007 | Gilliard et al. | |
| 7,319,133 B2* | 1/2008 | Brame et al. | 528/491 |
| 7,793,535 B2* | 9/2010 | Dubey et al. | 73/38 |
| 2003/0222362 A1* | 12/2003 | Indra et al. | 264/2.6 |
| 2004/0061246 A1* | 4/2004 | Cardiff et al. | 264/1.1 |
| 2004/0074525 A1* | 4/2004 | Widman et al. | 134/34 |
| 2004/0091613 A1 | 5/2004 | Wood et al. | |
| 2004/0119176 A1* | 6/2004 | Xia et al. | 264/1.32 |
| 2006/0186564 A1* | 8/2006 | Adams et al. | 264/1.32 |
| 2007/0035049 A1* | 2/2007 | Bruce et al. | 264/1.1 |
| 2007/0035052 A1 | 2/2007 | Goodenough et al. | |
| 2007/0035054 A1 | 2/2007 | Brame et al. | |
| 2007/0132125 A1* | 6/2007 | Rastogi et al. | 264/2.6 |
| 2007/0216045 A1* | 9/2007 | Francis | 264/1.1 |
| 2007/0257387 A1* | 11/2007 | Hofmann et al. | 264/1.32 |
| 2008/0073804 A1* | 3/2008 | Matsuzawa et al. | 264/2.6 |
| 2008/0128930 A1* | 6/2008 | Lai et al. | 264/2.6 |
| 2008/0143003 A1* | 6/2008 | Phelan | 264/1.36 |
| 2010/0046033 A1* | 2/2010 | Kulkarni et al. | 358/1.18 |
| 2010/0133710 A1* | 6/2010 | McCabe et al. | 264/1.36 |
| 2010/0151123 A1* | 6/2010 | Rathore et al. | 427/164 |
| 2010/0178317 A1* | 7/2010 | Burke et al. | 424/429 |
| 2010/0276824 A1* | 11/2010 | Pruitt et al. | 264/1.36 |
| 2010/0330146 A1* | 12/2010 | Chauhan et al. | 424/424 |

FOREIGN PATENT DOCUMENTS

| | | |
|---|---|---|
| JP | 59-107302 A | 6/1984 |
| WO | WO 95/11789 | 5/1995 |
| WO | WO 01/45868 A1 | 6/2001 |

OTHER PUBLICATIONS

Written Opinion completed and mailed Oct. 9, 2008 from corresponding PCT Application No. PCT/US2008/060886, filed Apr. 18, 2008 (5 pages).

International Preliminary Report on Patentability mailed Oct. 29, 20098 from corresponding International Application No. PCT/US2008/060886, filed Apr. 18, 2008 (8 pages).

\* cited by examiner

USE OF SURFACTANTS IN EXTRACTION PROCEDURES FOR SILICONE HYDROGEL OPHTHALMIC LENSES

FIELD

The embodiments described herein relate to methods of producing silicone hydrogel ophthalmic lenses, and in particular, methods that include extracting extractable material from polymerized silicone hydrogel ophthalmic lens products.

BACKGROUND

Cast molded silicone hydrogel contact lenses are produced by polymerizing a polymerizable silicone hydrogel lens forming composition in a contact lens mold assembly. The polymerized silicone hydrogel contact lens product is subsequently removed from the mold assembly and undergoes an extraction procedure to form an extracted polymerized silicone hydrogel lens product that is substantially free of extractable components. The extracted polymerized silicone hydrogel lens product is then hydrated in an aqueous liquid, inspected, packaged, sterilized, and distributed.

During the extraction process, each silicone hydrogel contact lens product is typically individually loaded in a pocket or recess of a tray or lens carrier. The tray may include a plurality of pockets or recesses for holding a plurality of silicone hydrogel contact lens products. While in the tray, the silicone hydrogel lens products are exposed to one or more solutions or compositions that may include any one or a combination of organic solvents and water in order to extract the extractable components from the silicone hydrogel lens products. Concurrently therewith or as a separate step at a different station, the silicone hydrogel lens products are hydrated with water, such as deionized water or an aqueous solution.

The silicone hydrogel lens products undergo swelling and shrinking as a result of exposure to solutions used in the extraction and hydration steps. When placed in contact with an alcohol, a pre-extracted silicone hydrogel lens product will expand to a greater degree compared to when soaking in a solution containing only part alcohol, which expands more than when placed in a solution with only water. During these swelling and shrinking episodes, the silicone hydrogel contact lens products are susceptible to surface distortion that may be caused by, for example, the surface of the silicone hydrogel contact lens products being temporarily pressed against or adhering to a carrier pocket surface or recess surface while undergoing swelling and shrinking.

Based on the above, there is a need for a method that substantially reduces surface distortion of silicone hydrogel contact lens products resulting from extraction procedures, as well as improvements in the manufacture of silicone hydrogel contact lenses, such as improvements in extraction procedures.

SUMMARY

In accordance with one aspect of the invention, a method of producing a silicone hydrogel ophthalmic lens includes polymerizing a polymerizable silicone hydrogel lens forming composition in an ophthalmic lens mold assembly to produce a polymerized silicone hydrogel lens product, removing the polymerized silicone hydrogel lens product from the mold assembly to produce a delensed ophthalmic lens product, contacting the delensed ophthalmic lens product with a liquid composition that comprises alcohol, water, and a surfactant, and subsequently contacting the delensed ophthalmic lens product with water to produce a hydrated silicone hydrogel ophthalmic lens.

In accordance with another aspect of the invention, a method of preventing surface distortion in a silicone hydrogel ophthalmic lens resulting from extraction and hydration procedures during the manufacture of the silicone hydrogel ophthalmic lens includes contacting a delensed polymerized silicone hydrogel ophthalmic lens product with a liquid composition including alcohol, water, and a surface distortion preventing amount of a surfactant.

In accordance with another aspect of the invention, a method of reducing surface distortion in a batch of silicone hydrogel ophthalmic lenses resulting from extraction and hydration procedures during the manufacture of the batch of silicone hydrogel ophthalmic lenses includes contacting a batch of delensed polymerized silicone hydrogel ophthalmic lens products with a liquid composition including alcohol, water, and a surface distortion reducing amount of a surfactant. The amount of surface distortion present in the batch of lens products is less than the amount of surface distortion present in a batch of substantially identical delensed polymerized silicone hydrogel ophthalmic lens products contacted with a liquid composition comprising alcohol, water, and no surfactant.

In accordance with another aspect of the invention, an extraction and hydration method for a silicone hydrogel lens product includes contacting the silicone hydrogel lens product with at least a first liquid composition comprising alcohol, water, and a surfactant, and contacting the silicone hydrogel lens product with at least a second liquid composition comprising water.

In accordance with another aspect of the invention, an extraction and hydration method for a silicone hydrogel lens product includes contacting the silicone hydrogel lens product with a first liquid composition comprising an organic solvent, contacting the silicone hydrogel lens product with a second liquid composition comprising an organic solvent, water and a surfactant, and contacting the silicone hydrogel lens product with a third liquid composition comprising water.

DETAILED DESCRIPTION

Figure 1:
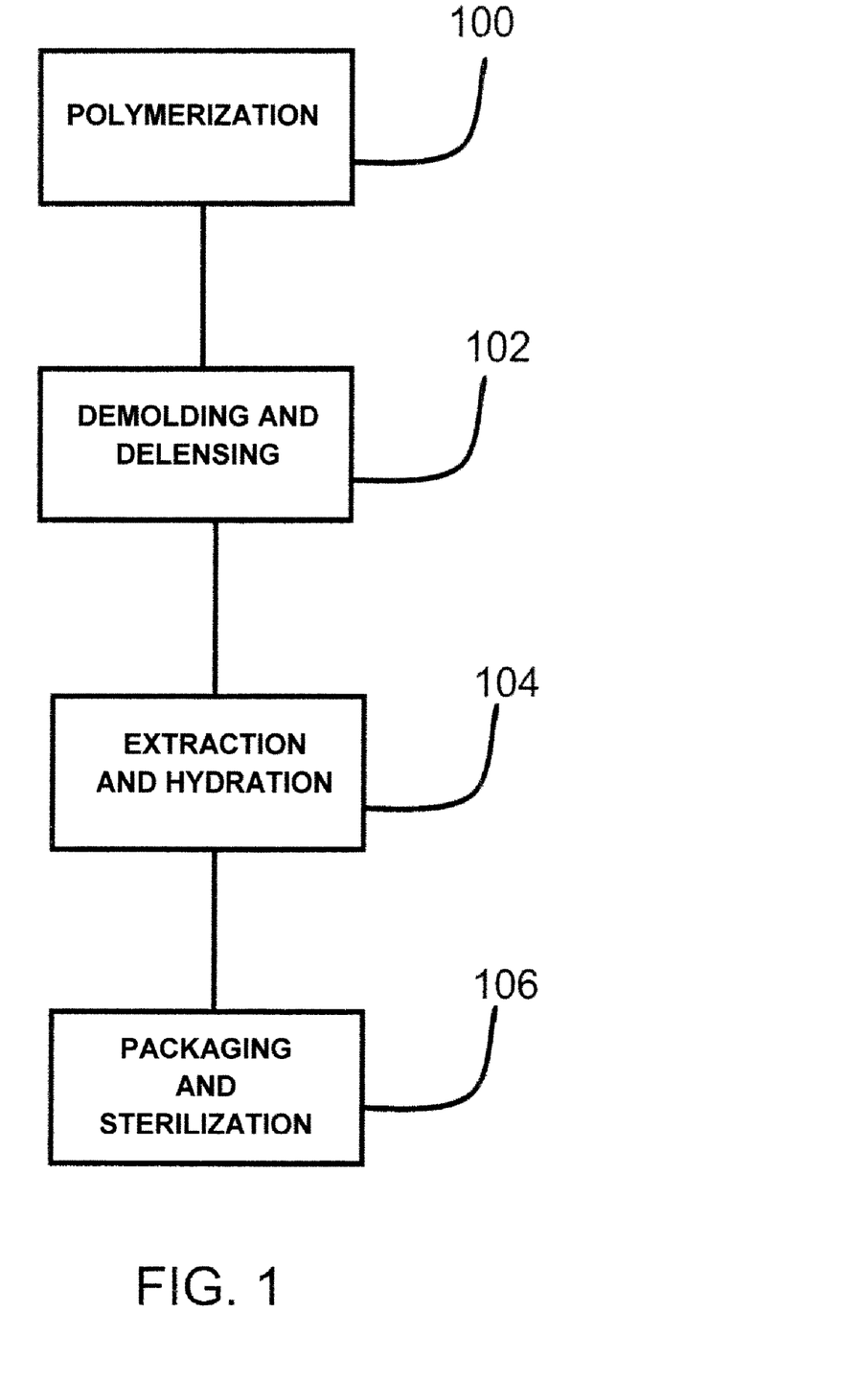
FIG. 1 is a flow chart showing a method of manufacturing silicone hydrogel ophthalmic lenses.

FIG. 1 is a schematic flow chart depicting a method of manufacturing a silicone hydrogel ophthalmic lens. The method includes forming a polymerized silicone hydrogel ophthalmic lens product at step 100. The method further includes demolding and delensing the polymerized silicone hydrogel ophthalmic lens product at step 102. The polymerized silicone hydrogel ophthalmic lens product is then extracted and hydrated at step 104 by contacting the hydrogel ophthalmic lens product with one or more liquids or liquid compositions, such as organic solvents, aqueous compositions, and combinations thereof. In accordance with the present disclosure, at least one of the baths containing liquid or liquid compositions used in the extraction and hydration process incorporates an activator for reducing the surface tension of the bath. As further discussed below, preferably the activator is a surfactant. When the extraction of the ophthalmic lens is performed with a lens holder that may cause surface distortion to the extracted/hydrated ophthalmic lens, the presence of the activator can prevent surface distortion in a single lens or reduce surface distortion present in a batch of ophthalmic lenses. Following the extraction and hydration steps, the hydrated silicone hydrogel ophthalmic lens is packaged and sterilized in step 106. Optionally, the lens may be subject to surface treating, buffing, and polishing prior to packaging and sterilizing. Silicone hydrogel lens forming materials are well known in the art. Examples of silicone hydrogel contact lens materials include materials having the following United States Adopted Names (USANs): balafilcon A (PUREVISION, Bausch & Lomb), lotrafilcon A (NIGHT & DAY, CIBA Vision), lotrafilcon B (O2OPTIX, CIBA Vision), galyfilcon A (ACUVUE ADVANCE, Vistakon), senofilcon A (ACUVUE OASYS, Vistakon), comfilcon A (BIOFINITY, CooperVision), and enfilcon A (CooperVision).

The method of forming the silicone hydrogel lens product at step 100 includes adding a polymerizable silicone hydrogel lens forming composition to a mold section of an ophthalmic lens mold assembly. The mold assembly (not shown) may include a concave lens-defining surface and a complementary convex lens-defining surface that when mated together define a space corresponding to the shape of the resulting hydrogel ophthalmic lens product. The silicone hydrogel lens forming material can be added to the concave lens-defining surface. The lens forming material is allowed to cure or polymerize by methods that are known to those of ordinary skill in the art, such as irradiation with UV light, heat exposure and other non-thermal method. After forming the silicone hydrogel lens product, the mold sections are demolded and the lens product is delensed at step 102, as described above.

Figure 2:
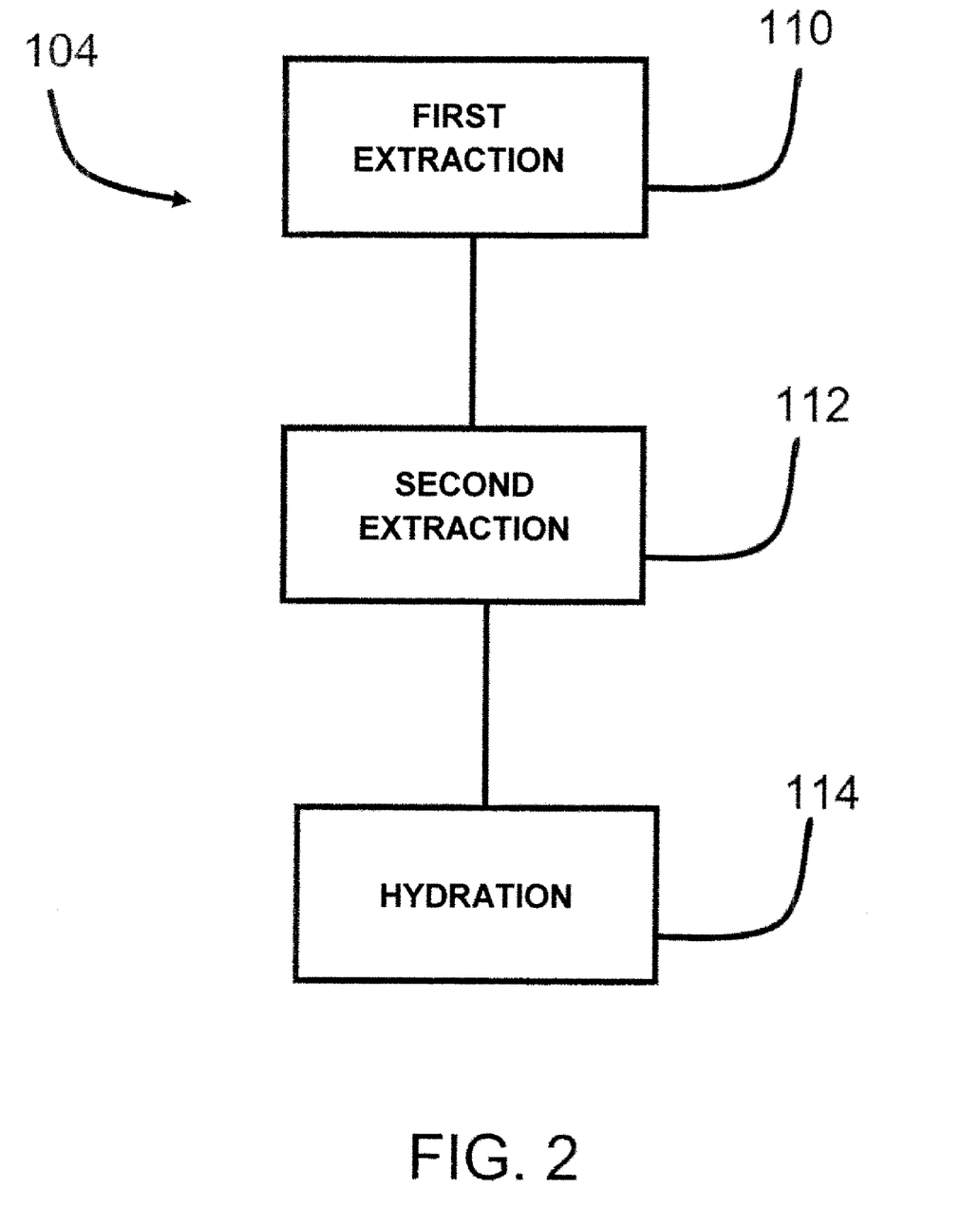
FIG. 2 is a flow chart showing a method of extracting and hydrating silicone hydrogel ophthalmic lens products.
Figure 3:
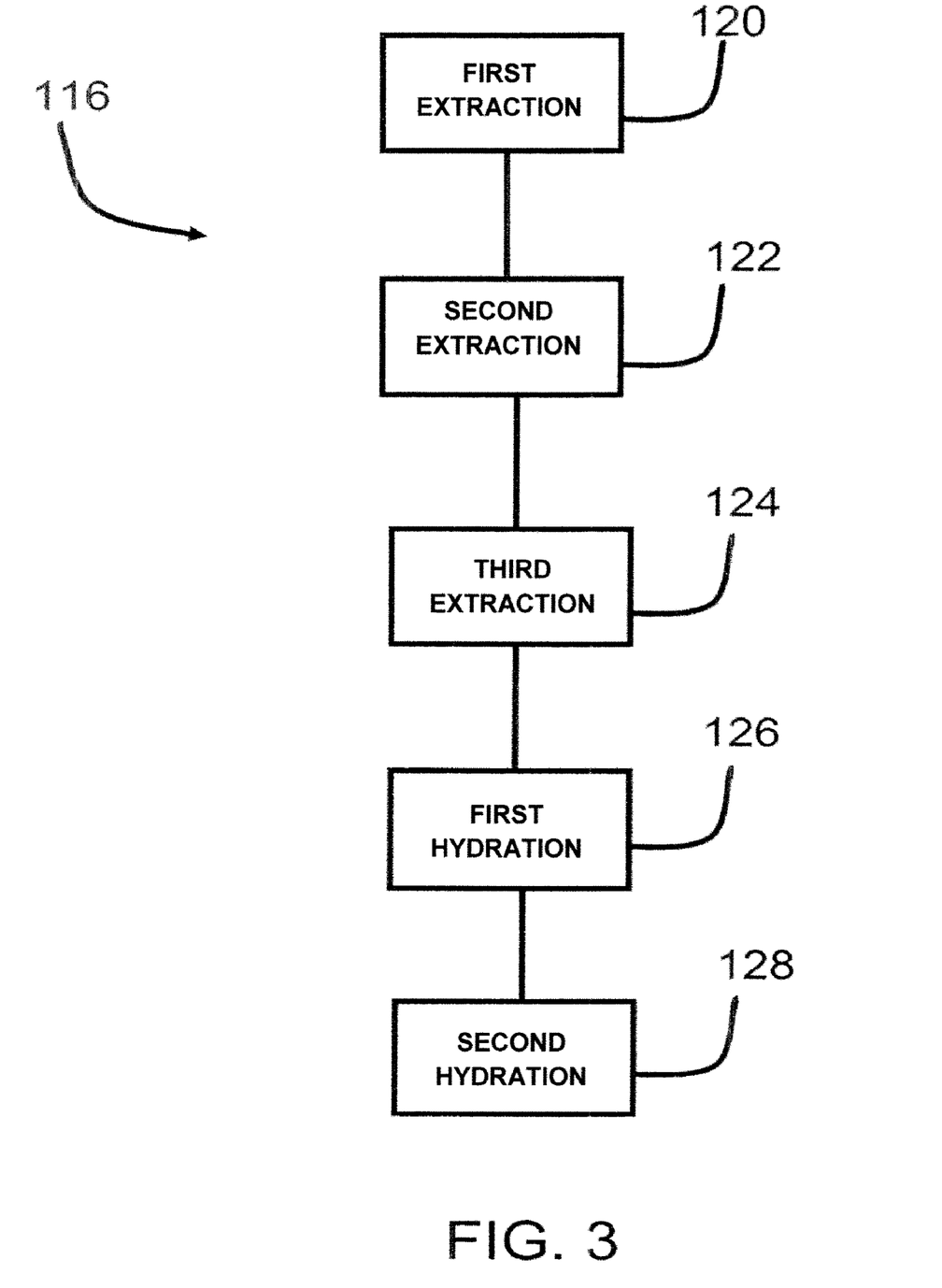
FIG. 3 is a flow chart showing another method of extracting and hydrating silicone hydrogel ophthalmic lens products.

FIG. 2 is a schematic flow chart depicting details of the extraction and hydration step 104 of FIG. 1. The embodiment shown in FIG. 2 depicts an extraction and hydration process 104 as having three distinct steps. However, as is readily apparent to those of ordinary skill in the art, extraction and hydration can include any number of steps, such as a single step or greater than three steps, some of which may be repetitive of earlier step(s). Accordingly, in an alternative embodiment, the process of extracting and hydrating a silicone hydrogel ophthalmic lens product includes five distinct steps, as shown in FIG. 3, and as further discussed below. Moreover, the solution or bath used in the last step of the different methods described herein may be used as the same solution for packaging the contact lens products. However, in a preferred method, the steps described herein are in addition to a packaging step in which a different buffer solution is used to package the contact lenses.

Figure 4:
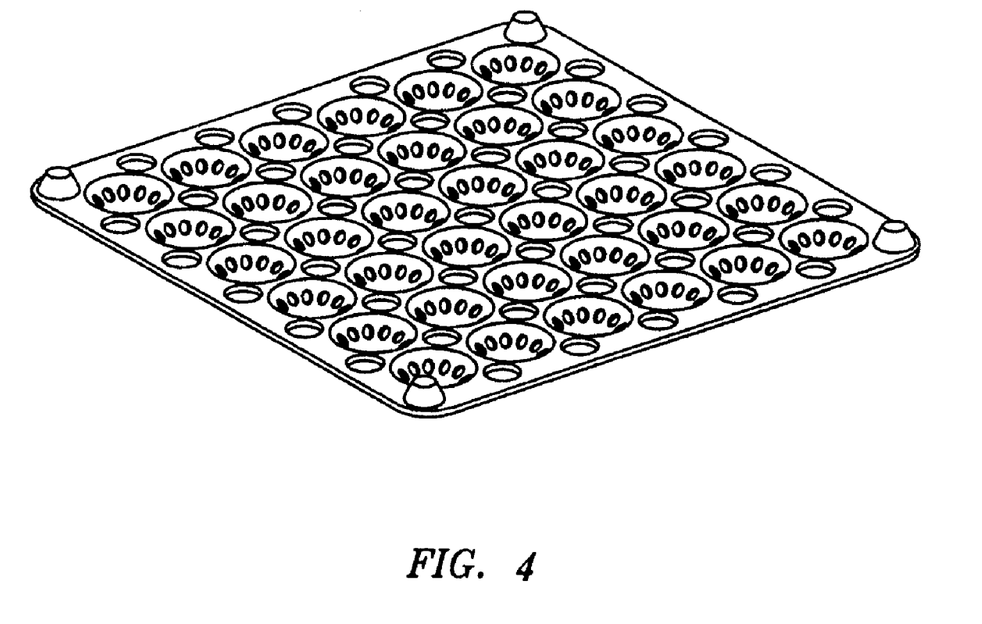
FIG. 4 is a perspective view of a carrier that holds silicone hydrogel ophthalmic lens products during extraction and hydration procedures.

Referring again to FIG. 2, during an extraction step 110, the silicone hydrogel ophthalmic lens product is placed in contact with one or more extraction compositions to extract extractable materials from the silicone hydrogel lens product. In one exemplary process, a plurality of silicone hydrogel ophthalmic lens products are placed in a plurality of pockets or recesses of a lens carrier, which can then be immersed in the extraction compositions. An exemplary lens carrier is illustrated in FIG. 4. In this embodiment, a single silicone hydrogel contact lens product is placed in a single carrier pocket or recess.

The extraction solutions used in the various steps can include organic solvents. For example, at least one of the extraction solutions can include 100% ethanol, methanol, propanol, or other alcohols, and combinations thereof. At least one of the extraction solutions can also be a composition having a mixture of alcohol or solvent, such as ethanol, water and a surfactant. The amount of ethanol and water in the mixture can be 50% ethanol and 50% deionized water, 70% ethanol and 30% deionized water, 90% ethanol and 10% deionized water, or any percent ratio by volume therebetween.

Extraction can be practiced at different temperatures. For example, the extraction can occur at room temperature (e.g., about 20° C.), or at an elevated temperature (e.g., from about 25° C. to about 100° C.). The temperature at which the extraction is performed will at least in part be influenced by the amount and type of alcohol present in the extraction tank. For example, when an extraction composition is mostly water, it may be possible to extract the contact lens products at temperatures closer to 100° C. than if the extraction composition is mostly alcohol. In addition, in certain embodiments, the extraction step 110 can include a step of contacting, which includes washing, soaking, bathing, or rinsing, the silicone hydrogel lens products with a mixture of alcohol and water or with just water, preferably distilled or deionized water and more preferably deionized water.

As shown in FIG. 2, the silicone hydrogel lens product can undergo three exemplary extraction and hydration steps. In the first extraction step 110, the plurality of silicone hydrogel lens products are placed in a tray or carrier, such as that shown in FIG. 4, and then in contact with a solvent, which may be ethanol. As a result, residual or extractable components that are soluble in ethanol are extracted from the silicone hydrogel lens products. Extractable components may include, for example, unpolymerized lens forming monomers and low molecular weight oligomers, diluents, and the like. In the second extraction step 112, the silicone hydrogel lens products are placed in contact with a mixture of ethanol, deionized water and a surfactant. The ratio of ethanol to deionized water is preferably 1:1 but may be any other ratio that can yield a desired result. The surfactant may be any type that is known to those of ordinary skill in the art. Exemplary surfactants include ionic surfactants, non-ionic surfactants, and combinations thereof. For example, the surfactant can be TWEEN 80 (also known as POLYSORBATE 80, or its chemical name polyoxyethylene sorbitan monooleate). An effective surfactant amount may be used as an activator for lowering the surface tension of water. In a preferred embodiment, 20 ppm to 500 ppm, and more preferably 80 ppm to 150 ppm of TWEEN 80 is added to the EtOH-DI water composition. Each step can be maintained from between 10 minutes to about 90 minutes depending on the lens material. Examples of ionic surfactants useful in the present methods include, without limitation, sodium dodecylsulfate, sodium stearate, ammonium lauryl sulfate, and the like, and combinations thereof. Examples of non-ionic surfactants include TWEEN 80. TRITON AG 98 (Rhone-Poulenc), POLOXAMER 407, and the like, and combinations thereof. These ionic and non-ionic surfactants may also be provided in an amount from 20 ppm to about 500 ppm, and any value therebetween.

In the third step 114, the silicone hydrogel lens products are placed in contact with a volume of deionized water to hydrate the lenses. The volume of deionized water preferably includes an effective amount of surfactant, such as 100 ppm of TWEEN 80. The use of an effective amount of surfactant in the ethanol/water liquid composition and/or the deionized water bath has been found to substantially prevent or eliminate lens distortion that may occur during the extraction process. This is especially apparent in lens carriers that have physical features on the surfaces in which the lens may contact, such as the holes or openings present in the carrier of FIG. 4. While not wishing to be bound by any particular theory or mechanism of action, factors that can contribute to such possible distortion is the silicone hydrogel lens product either temporarily adhering to or pressing against the bottom of an upper tray during the extraction process. Then as the trays are placed in contact with subsequent baths, the lens products decrease in diameter while concurrently being constrained by the adhesion, which causes the lens products to distort. As a result of using an effective amount of surfactant in the ethanol/water liquid composition in step 112 and/or the subsequent deionized water bath in step 114, the surface tension of the baths is reduced and the lenses exhibit reduced adherence to the carrier. Consequently, this allows the ophthalmic lenses to freely swell and contract without being constrained and therefore less prone to distortion.

Thus, in accordance with the methods provided herein, a finished silicone hydrogel ophthalmic lens can maintain its designed shape with no distortion or noticeably less distortion as compared to a similar process without the ethanol/water/surfactant liquid composition and/or the water bath having a reduced surface tension as provided in accordance with aspects of the present invention. After the extraction and hydration process 114, the hydrated silicone hydrogel ophthalmic lens may be sterilized and packaged in a buffered saline solution, as is well known in the art.

As described in the foregoing, the extraction and hydration process may include any number of steps, ranging from one or two and more than two. A surfactant may be added to any water-containing compositions or water baths used in the various extraction and hydration steps to prevent or substantially prevent distortion of the silicone hydrogel ophthalmic lens products. For example, as described above, a surfactant can be added to a liquid composition that includes alcohol, such as ethanol, and deionized water. Additionally, the surfactant can be added to any other liquid compositions or liquid that may be used prior to or after the solvent/water or alcohol/water composition. For example, the surfactant is present in the solvent/water composition, and can be present in one or more water baths in which the lenses are placed after contacting the solvent/water/surfactant bath. In addition, some embodiments may include contacting the silicone hydrogel ophthalmic lens products with a non-aqueous or water-free, solvent-containing composition containing a surfactant.

The use of an effective amount of surfactant in a liquid composition during the and hydration steps has been shown in experiments to substantially reduce surface distortion in silicone hydrogel contact lens products extracted using carriers as shown in FIG. 4. In one particular experiment, five extraction and hydration steps, with each step lasting about 30 minutes, as shown in FIG. 3 were performed. The five steps included contacting the hydrogel lens products with ethanol at step 120; contacting the contact lenses in ethanol again at step 122; contacting the lens products in a composition of ethanol, deionized water and 100 ppm of TWEEN 80 at step 124; contacting the lenses in deionized water and 100 ppm of TWEEN 80 at step 126; and lastly contacting the lenses in deionized water and 100 ppm of TWEEN 80 at step 128. After removing the lens products from the trays and inspecting them, a significant reduction in lens distortion was found in the silicone hydrogel contact lens products as compared to similar lens products that were subjected to the same five steps but without the use of a surfactant in any of the extraction and hydration compositions. Evaluation of surface distortion of the lenses can be determined visually using a knife edge optical system. One example of a knife edge optical system useful to determine the presence or absence of surface distortion is disclosed in U.S. Pat. No. 4,784,485. Surface distortion is evident when the surface of the hydrated silicone hydrogel lens includes one or more raised portions extending from a substantially smooth spherical or aspherical curved lens surface.

Although the disclosure herein refers to certain specific embodiments, it is to be understood that these embodiments are presented by way of example and not by way of limitation. Any feature or combination of features described herein are included within the scope of the present invention provided that the features included in any such combination are not mutually inconsistent as will be apparent from the context, this specification, and the knowledge of one of ordinary skill in the art. In addition, any feature or combination of features may be specifically excluded from any embodiment disclosed herein. The intent of the foregoing detailed description, although discussing exemplary embodiments, is to be construed to cover all modifications, alternatives, and equivalents of the embodiments described in the present description and claims.

What is claimed is:

1. A method of producing a silicone hydrogel ophthalmic lens, comprising:
   polymerizing a polymerizable silicone hydrogel lens forming composition in an ophthalmic lens mold assembly to produce a polymerized silicone hydrogel lens product;
   removing the polymerized silicone hydrogel lens product from a concave lens-defining surface and a convex lens-defining surface of the mold assembly to produce a demolded and delensed ophthalmic lens product;
   prior to contacting the demolded and delensed lens product with any liquid, placing the demolded and delensed ophthalmic lens product in a lens carrier that has physical features on its surface which the lens product can contact;
   extracting materials from the delensed ophthalmic lens product by contacting the demolded and delensed ophthalmic lens product with a liquid composition that comprises alcohol, water, and a surfactant;
   subsequently contacting the demolded and delensed ophthalmic lens product with water to produce a hydrated silicone hydrogel ophthalmic lens;
   wherein the physical features comprise openings or holes located within pockets or recesses; and
   wherein the resulting ophthalmic lens product has no surface distortion or has less surface distortion as compared to a substantially identical resulting ophthalmic lens product produced from a substantially identical demolded and delensed ophthalmic lens product by a substantially identical process but without the surfactant present in the liquid composition.

2. The method of claim 1, wherein the hydrated silicone hydrogel ophthalmic lens is produced from contacting the demolded, delensed and extracted ophthalmic lens product with water that comprises a surfactant.

3. The method of claim 1, wherein the hydrated silicone hydrogel ophthalmic lens is produced from contacting the demolded and delensed ophthalmic lens product with a first volume of water that comprises a surfactant, and subsequently contacting the delensed ophthalmic lens product with a second volume of water.

4. The method of claim 3, wherein the second volume of water comprises a surfactant.

5. The method of claim 1, wherein the liquid composition comprises about 100 ppm of polyoxyethylene sorbitan monooleate.

6. A method of preventing surface distortion in a silicone hydrogel ophthalmic lens resulting from extraction and hydration procedures during the manufacture of the silicone hydrogel ophthalmic lens, comprising:
prior to contacting a demolded and delensed polymerized silicone hydrogel ophthalmic lens product with any liquid, placing the demolded and delensed polymerized silicone hydrogel ophthalmic lens product in a lens carrier that has physical features on its surface which the lens product can contact;
extracting materials from the demolded and delensed polymerized silicone hydrogel ophthalmic lens product by contacting the demolded and delensed polymerized silicone hydrogel ophthalmic lens product with a liquid composition comprising alcohol, water, and a surface distortion preventing amount of a surfactant;
wherein the physical features comprise openings or holes located within recesses or pockets; and
wherein the resulting polymerized silicone hydrogel ophthalmic lens product has no distortion or has less distortion as compared to a substantially identical resulting polymerized silicone hydrogel ophthalmic lens product produced from a substantially identical demolded and delensed polymerized silicone hydrogel ophthalmic lens product by a substantially identical process but without the surfactant present in the liquid composition.

7. The method of claim 6, further comprising contacting the demolded and delensed ophthalmic lens product with another liquid composition comprising water.

8. The method of claim 6, wherein the another liquid composition further comprises a surfactant.

9. The method of claim 6, wherein the liquid composition comprises about 100 ppm of polyoxyethylene sorbitan monooleate.

10. A method of reducing surface distortion in a batch of silicone hydrogel ophthalmic lenses resulting from extraction and hydration procedures during the manufacture of the batch of silicone hydrogel ophthalmic lenses, comprising:
prior to contacting a batch of demolded and delensed polymerized silicone hydrogel ophthalmic lens products with any liquid, placing the batch of demolded and delensed polymerized silicone hydrogel ophthalmic lens products in a lens carrier that has physical features on its surface which the lens products can contact;
extracting materials from the batch of demolded and delensed polymerized silicone hydrogel ophthalmic lens products by contacting the batch of demolded and delensed polymerized silicone hydrogel ophthalmic lens products with a liquid composition including alcohol, water, and a surface distortion reducing amount of a surfactant;
wherein the physical features comprise openings or holes located within pockets or recesses; and
wherein the amount of surface distortion present in the resulting batch of lens products is less than the amount of surface distortion present in a resulting batch of substantially identical resulting polymerized silicone hydrogel ophthalmic lens products produced from a batch of substantially identical demolded and delensed polymerized silicone hydrogel ophthalmic lens product using a substantially identical process except the batch of substantially identical demolded and delensed product is contacted with a liquid composition comprising alcohol, water, and no surfactant.

11. An extraction and hydration method for a silicone hydrogel lens product, the method comprising:
prior to contacting a demolded and delensed silicone hydrogel lens product with any liquid, placing the demolded and delensed silicone hydrogel lens product in a lens carrier that has physical features on its surface which the lens product can contact;
extracting materials from the demolded and delensed silicone hydrogel lens product by contacting the demolded and delensed silicone hydrogel lens product with at least a first liquid composition comprising alcohol, water, and a surfactant;
contacting the demolded and delensed silicone hydrogel lens product with at least a second liquid composition comprising water;
wherein physical features comprise openings or holes located within pockets or recesses; and
wherein the amount of surface distortion present in the resulting delensed silicone hydrogel lens product is less than the amount of surface distortion present in a substantially identical resulting silicone hydrogel lens product produced using a substantially identical process except the substantially identical demolded and delensed silicone hydrogel lens product is contacted with a liquid composition comprising alcohol, water, and no surfactant.

12. The method of claim 11, wherein the second liquid composition further comprises a surfactant.

13. The method of claim 11, further comprising contacting the demolded and delensed silicone hydrogel lens product with at least a third liquid composition comprising water.

14. The method of claim 11, wherein the third liquid composition further comprises a surfactant.

15. The method of claim 11, wherein the first liquid composition comprises about 100 ppm of polyoxyethylene sorbitan monooleate.

16. An extraction and hydration method for a silicone hydrogel lens product, the method comprising:
prior to contacting a demolded and delensed silicone hydrogel lens product with any liquid, placing the demolded and delensed silicone hydrogel lens product in a lens carrier that has physical features on its surfaces which the lens product can contact;
extracting materials from the demolded and delensed silicone hydrogel lens product by contacting the demolded and delensed silicone hydrogel lens product with a first liquid composition comprising an organic solvent;
contacting the demolded and delensed silicone hydrogel lens product with a second liquid composition comprising an organic solvent, water and a surfactant;
contacting the demolded and delensed silicone hydrogel lens product with a third liquid composition comprising water;
wherein the physical features comprise holes or openings located within pockets or recesses; and
wherein the resulting silicone hydrogel lens product has no surface distortion or has less surface distortion as compared to a substantially identical resulting silicone hydrogel lens product produced from a substantially identical demolded and delensed silicone hydrogel lens product by a substantially identical process but without the surfactant present in the liquid composition.

17. The method of claim 16, wherein the third liquid composition further comprises a surfactant.

18. The method of claim 16, wherein the second liquid composition comprises about 100 ppm of polyoxyethylene sorbitan monooleate.

19. The method of claim 16, wherein the organic solvent comprises ethanol.

20. The method of claim 2, wherein the surfactant in the water is the same as the surfactant in the liquid composition.

21. The method of claim 4, wherein the surfactant in the second volume of water is the same as the surfactant in the liquid composition.

22. The method of claim 8, wherein the surfactant in the another liquid composition is the same as the surfactant in the liquid composition.

23. The method of claim 12, wherein the surfactant in the second liquid composition is the same as the surfactant in the first liquid composition.

24. The method of claim 14, wherein the surfactant in the third liquid composition is the same as the surfactant in the first liquid composition.

25. The method of claim 17, wherein the surfactant in the third liquid composition is the same as the surfactant in the second liquid composition.

* * * * *

UNITED STATES PATENT AND TRADEMARK OFFICE
CERTIFICATE OF CORRECTION

| | | |
|---|---|---|
| PATENT NO. | : 7,968,018 B2 | Page 1 of 1 |
| APPLICATION NO. | : 11/737059 | |
| DATED | : June 28, 2011 | |
| INVENTOR(S) | : Jay Scott Daulton et al. | |

It is certified that error appears in the above-identified patent and that said Letters Patent is hereby corrected as shown below:

On the Title page, item (56), under (Foreign Patent Documents), in column 2, line 1, delete "A" and insert -- A1 --, therefor.

In column 4, line 57, delete "80." and insert -- 80, --, therefor.

In column 8, line 19, in Claim 11, after "resulting" delete "delensed".

Signed and Sealed this
Tenth Day of April, 2012

David J. Kappos
*Director of the United States Patent and Trademark Office*